(12) United States Patent
Edgar et al.

(10) Patent No.: US 12,554,411 B1
(45) Date of Patent: Feb. 17, 2026

(54) MULTI-ACTUATOR DEVICE WITH SHARED READ CHANNEL

(71) Applicant: Seagate Technology LLC, Fremont, CA (US)

(72) Inventors: Brian T. Edgar, Shakopee, MN (US); Raye A. Sosseh, Edina, MN (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 18/821,907

(22) Filed: Aug. 30, 2024

(51) Int. Cl.
*G06F 3/06* (2006.01)
*G11B 5/55* (2006.01)

(52) U.S. Cl.
CPC .......... *G06F 3/0613* (2013.01); *G06F 3/0659* (2013.01); *G06F 3/0676* (2013.01); *G11B 5/5578* (2013.01)

(58) Field of Classification Search
CPC .... G06F 3/0613; G06F 3/0659; G06F 3/0676; G11B 5/5578
See application file for complete search history.

(56) References Cited

U.S. PATENT DOCUMENTS

| | | | |
|---|---|---|---|
| 10,049,691 B1* | 8/2018 | Gaertner | G11B 5/5578 |
| 10,783,910 B2 | 9/2020 | Zhu et al. | |
| 11,222,658 B1* | 1/2022 | Wernow | G11B 5/4833 |
| 2012/0250177 A1* | 10/2012 | Somanache | G11B 5/5578 |
| | | | 360/274 |

OTHER PUBLICATIONS

Zheng, Jinchuan. Dual-actuator servo system design for fast data rate and high density hard disk drives. Nanyang Technological University. Diss. 2006. (Year: 2006).*

* cited by examiner

*Primary Examiner* — Nicholas J Simonetti
(74) *Attorney, Agent, or Firm* — HOLZER PATEL DRENNAN (57) ABSTRACT

A multi-actuator storage device includes a first actuator supporting a first read element coupled to a shared read channel, a second actuator supporting a second read element coupled to the shared read channel, and a job scheduler that employs a lowest-access time selection methodology when selecting each next job to schedule on the first actuator. When the lowest-access-time methodology results in the selection of a read job for execution by the first actuator, the job scheduler identifies a pending job for execution by the second actuator that can be executed concurrent to the first read job without concurrently accessing the read channel and schedules the pending job on the second actuator concurrent to the first read job.

20 Claims, 7 Drawing Sheets

FIG. 1

Read Queue 202

| Job ID | Actuator | Access time | Read Time |
|---|---|---|---|
| 1 | A | 15 ms | 10 ms |
| 2 | A | 9 ms | 12 ms |
| 3 | A | 3 ms | 16 ms |
| 4 | A | 8 ms | 6 ms |
| 6 | B | 14 ms | 16 ms |
| 7 | B | 17 ms | 8 ms |
| 8 | A | 14 ms | 12 ms |

Shared Read Channel Job Schedule 204

| Job ID | Acutator | Start Time | Stop time | Start Position | Stop Position |
|---|---|---|---|---|---|
| 3 | A | T1 | T2 | Track M, Sector A | Track M, sector O |

Read Queue 202

| Job ID | Actuator | Access time | Read Time |
|---|---|---|---|
| 1 | A | 19 ms | 10 ms |
| 2 | A | 13 ms | 12 ms |
| 6 | B | 13 ms | 16 ms |
| 7 | B | 18 ms | 12 ms |

Identical access times invoke collision avoidance logic → Set Last_Selected_Actuator=Actuator_B Shared Read Channel Job Schedule 204

| Job ID | Start Time | Stop time | Actuator | Start Position | Stop Position |
|---|---|---|---|---|---|
| 3 | T1 | T2 | A | Track M, Sector A | Track M, sector O |
| 8 | T2 | T3 | B | Track L, Sector C | Track L, Sector W |
| 4 | T2 | T4 | A | Track B, Sector B | Track N, Sector D |
| 6 | T4 | T5 | B | Track D, Sector A | Track D, Sector L |

Read Queue 202

| Job ID | Actuator | Access time | Read Time |
|---|---|---|---|
| 1 | A | 20 ms | 10 ms |
| 2 | A | 14 ms | 12 ms |
| 7 | B | 6 ms | 12 ms |

Shared Read Channel Job Schedule 204

| Job ID | Start Time | Stop time | Actuator | Start Position | Stop Position |
|---|---|---|---|---|---|
| 3 | T1 | T2 | A | Track M, Sector A | Track M, sector O |
| 8 | T2 | T3 | B | Track L, Sector C | Track L, Sector W |
| 4 | T2 | T4 | A | Track B, Sector B | Track N, Sector D |
| 6 | T4 | T5 | B | Track D, Sector A | Track D, Sector L |
| 7 | T5 | T6 | B | Track F, Sector K | Track F, Sector Q |
| 1 | T5 | T7 | A | Track K, Sector A | Track K, Sector H |
| 2 | T7 | T8 | A | Track O, Sector P | Track O, Sector V |

Concurrent start times

MULTI-ACTUATOR DEVICE WITH SHARED READ CHANNEL

BACKGROUND

Presently, storage device manufacturers are faced with an industry-wide demand for devices with greater storage capacities and faster data access. While newer technologies such as solid-state drives (SSDs) are gaining popularity, traditional magnetic disk storage devices, or hard disk drives (HDDs), are much less expensive to manufacture and, therefore, remain appealing for a variety of use cases. To remain competitive in the market, HDD manufacturers seek to improve HDD performance while still retaining cost advantages over other types of drives.

Although not widely adopted in the industry, multi-actuator devices have been proposed as one method of increasing read and write output in HDDs by allowing multiple reads and/or multiple writes to a disk simultaneously. Duplicating read/write control electronics is, however, expensive, and this high production cost poses a major impediment to the release and widespread use of multi-actuator HDDs. For this reason, HDD manufacturers are seeking ways to reduce the production cost of multi-actuator HDDs without significantly decreasing the read and write performance of these devices.

SUMMARY

Implementations disclosed herein provide for a multi-actuator storage device with a read channel that is shared by read elements on at least two different actuators. The storage device includes a job scheduler that employs a lowest-access time selection methodology when selecting each next job to schedule for execution. When the lowest-access-time methodology results in the selection of a read job for execution by the first actuator, the job scheduler identifies a pending job for execution by the second actuator that can be executed concurrent to the first read job without concurrently accessing the read channel and schedules the pending job on the second actuator concurrent to the first read job.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

DETAILED DESCRIPTION

Although not common in disk-based storage devices, multi-actuator storage device designs have been proposed as one way of improving read and write throughput. For example, a multi-actuator device may have two or more independently movable actuators, each supporting at least one read head and one write head. Some proposed multi-actuator devices include multiple write channels that facilitate parallel writes (e.g., writing data from multiple tracks at once) and multiple read channels that facilitate parallel reads (e.g., reading data from multiple tracks at once). However, the control electronics needed to process parallel data streams significantly contribute to manufacturing costs.

Presently, the manufacturing costs associated with including two or more complete read and write channels in a storage device pose a major impediment to bringing these multi-actuator devices to market. Read channel resources contribute to a significant portion of this increased cost. The read channel typically includes a detector (a hardware element), a decoder (a software element executed by an on-chip processor), and hardware registers (buffers) for temporarily storing the read data as it is subject to iterative decoding attempts by the detector and decoder. Collectively, these components provide for detecting the 1 and 0 values of bits stored on the storage media while also providing powerful recovery logic and error correction code to detect and correct errors in the read stream.

It has been postulated, as a basis for developing the herein-disclosed technology, that the de-duplication of read paths could present a route to cost-viable production of a multi-actuator device, provided that a significant improvement in overall data throughput could still be realized as compared to currently available single-actuator storage devices. Interestingly, recent customer workload trend data collected by cloud storage providers indicates that a larger quantity of data is, on average, being written per second as compared to the quantity of data that is being read back per second in these workloads. This suggests that advances in write throughput may have more of an overall impact on the performance of customer workloads than read throughput, which may help the overall throughput performance of a storage device with more write paths than read.

The herein-disclosed technology is a multi-actuator device design that includes a read path that is shared by at least two different actuators. This leverages the above-described cost savings attributable to read path "de-duplication" in combination with multi-actuator advancement while also offering improvements in read throughput as compared to presently available single actuator devices. These read throughput improvements are realized primarily because of novel scheduling techniques that leverage the ability to read data on one actuator while the other data is seeking to a new position or writing, thereby increasing the total percentage of time that the storage device is processing read data in the read channel as compared to single-actuator/single read channel designs.

While the herein-disclosed shared read channel architecture and scheduling techniques are not required to be implemented in combination with multi-channel write capability, it is recognized that a device implementing the disclosed technology and offering more write paths than read paths could offer a significant improvement in overall data throughput due, in part, to the write-heavy nature of most cloud customer workloads.

Figure 1:
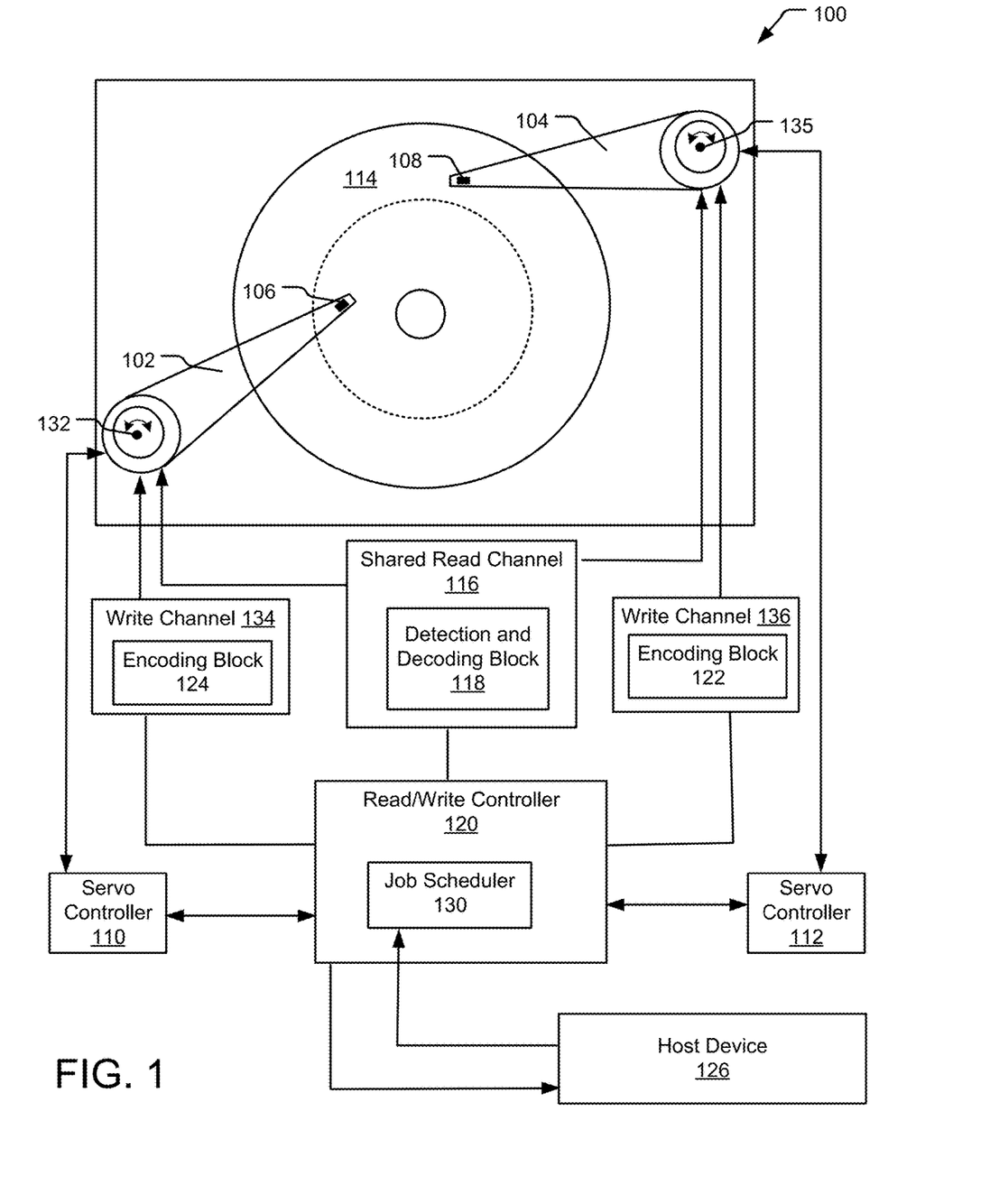
FIG. 1 illustrates a multi-actuator data storage device that includes more write paths than read path.

FIG. 1 illustrates a multi-actuator storage device 100 that includes more write paths than read path. In the disclosed design, the multi-actuator storage device 100 includes two actuators 102 and 104, each supporting a transducer head assembly 106 and 108, respectively. Each of the transducer head assemblies 106 and 108 includes at least one read element (not shown) and at least one write element (not shown)

In various implementations of the disclosed technology, the transducer head assemblies 106 and 108 may include different numbers of read and write elements arranged in different physical configurations. In one implementation that includes a single read element and a single write element on each of the transducer head assemblies 106 and 108, the single read element is also used during write operations to assist in track following. Specifically, the read element reads servo pattern information from a magnetic storage media 114 during each write operation. This servo pattern information is, in turn, sent to a corresponding servo controller 110 or 112, where it is processed to generate a position feedback signal used to adjust the position of the corresponding actuator to better follow the corresponding target data track on the magnetic storage media 114.

Still, other implementations of the disclosed technology include multiple read and/or write heads on each of the transducer head assemblies 106 and 108 and/or more than two actuators.

A key feature of the multi-actuator storage device 100 is a read channel ("shared read channel 116") that is shared between the actuators 102 and the actuator 104, such as by toggling the selection line of a multiplexor (not shown) to switch the read channel input between data flowing from the actuator 102 and the actuator 104, respectively. The shared read channel 116 includes a single detection and decoding block 118 coupled to a first read element on the actuator 102 and a second read element on the actuator 104. The detection and decoding block 118 is time-shared between the first read element and the second read element. Consequently, the detection and decoding block 118 may be used by transducer head assembly 106 (on the actuator 102) or by the transducer head assembly 108 (on the actuator 104), but not both simultaneously.

In one implementation, the detection and decoding block 118 includes a Viterbi detector that implements a soft output Viterbi Algorithm (SOVA engine) and a decoder that implements a decoding scheme such as a low-density parity check (LDPC) and/or the Reed-Solomon (RS) code. As a read element of a selected actuator (e.g., the actuator 102 or 104) flies over the magnetic storage media 114, data is read from the magnetic storage media 114 and placed into hardware registers (buffers) of the shared read channel 116, where it is processed by the detection and decoding block 118 to resolve each bit read from the storage media to a "1" or "0" with a degree of certainty that is guaranteed by a corresponding error correction scheme. For example, the Viterbi detector estimates a likelihood that each bit is a one or a zero (e.g., a log-likelihood ratio (LLR) and the decoder uses this likelihood to attempt to interpret the bit stream while using parity bits to detect and correct errors in the output of the Viterbi detector.

Although the shared read channel 116 is time-shared between the two actuators 102 and 104, each actuator includes an independent write channel, shown as write channel 134 and write channel 136, respectively. In the illustrated implementation, the write channel 134 includes a first encoding block 122 while the write channel 136 includes a second (duplicative) encoding block 124, each of which includes a combination of hardware and software elements configured to encode the user data traveling along the corresponding write channel 134 or 136 with parity bits used that are written to the magnetic storage media 114 along with data. While multiple write paths could boost data throughput, it is recognized that the multiple write paths shown in FIG. 1 are not required to practice the herein-disclosed technology.

A read/write controller 120 interfaces with a host device 126 and translates read/write commands received from the host device 126 to hardware control signals that affect the execution of the requested read/write operations within the multi-actuator storage device The read/write controller 120 manages and dynamically updates a mapping between a logical block address (LBA) space that is known to the host device 126 and the physical data blocks (sectors) on the magnetic storage media 114. Thus, upon receiving a read or write command specifying a target range of LBAs from the host device 126, the read/write controller 120 identifies a corresponding range of physical data blocks on the magnetic storage media 114 and generates a control signal that instructs the servo controllers (110 or 112) to drive a voice coil motor (not shown) to rotate a corresponding one of actuators 102 and 104 (about a corresponding actuator axis of rotation 132 or 135) to position the corresponding transducer head assembly 106 or 108 over the first sector of the targeted physical range of data blocks. Likewise, the read/write controller 120 operates one or more switches that facilitate the controlled flow of data through the shared read channel 116.

The read/write controller 120 includes a job scheduler 130 that dynamically builds a read schedule for the multi-actuator storage device 100 that prioritizes (selectively orders) read commands received from the host device 126 in a manner that efficiently utilizes the shared read channel 116 such that the read throughput of the multi-actuator storage device 100 exceeds that which is achievable in a single-actuator device with a single read element and read channel using presently existing technology.

As is made further apparent by the following discussion, the herein-disclosed scheduling techniques are most effective at improving read throughput when the job scheduler 130 has multiple reads to choose from at any given time. Therefore, greater performance may be realized at times when the read queue has greater depth.

The job scheduler 130 builds schedules of read and write operations based, at least in part, on access times determined in association with the operations. As used herein, the "access time" of a read or write operation is the time that it takes the corresponding actuator 102 or 104 to seek to a target data track (commonly referred to as "seek time") and wait for a first targeted data sector of the read or write operation to rotate beneath the corresponding read element (commonly referred to as "rotational latency").

As mentioned above, the shared read channel 116 cannot simultaneously process read data received from the actuator 102 and the actuator 104. However, an assumption can be made that any time an actuator is seeking (moving) to a target data track, the actuator is not reading data. The multi-actuator storage device 100 improves read throughput by leveraging this assumption and actively scheduling certain read operations current to seek operations as well as to write operations of the other actuator.

According to one implementation, read jobs are scheduled from a read queue based at least in part on access time—that is, read jobs with low access times are favored for selection over read jobs with higher access times. Each time a read job is scheduled for execution by one actuator, the job scheduler 130 determines whether the read and write queues of the storage device 100 include any candidate jobs that can be permissible executed during (e.g., concurrent to) the selected read job. These candidate jobs that qualify for concurrent execution include write operations of all types and select read operations characterized by access times that exceed the total execution time of the selected read job. Stated differently, concurrent execution of read jobs is permitted in limited scenarios where it is assured that the two actuators will not access the shared read channel 116 at the same time—e.g., one actuator finishes reading data while the other actuator is seeking to new read position.

To exemplify a permissible "read-during-seek" scenario, assume that a first read operation has been selected for execution by the actuator 102. Readying the multi-actuator storage device 100 for this first read operation entails rotating the actuator 102 by some angular degree from a current position to align the transducer head assembly 106 with a target data track on the magnetic storage media 114. This seeking of the actuator 102 spans a first-time interval—t1. Following a rotation of the actuator 102, the first read operation still does not commence until the first sector targeted by the first read operation rotates under the transducer head assembly 106—a rotation that spans another time interval, t2. Here, the access time of the first read operation is t1+t2, and it can be assumed that the actuator 102 will not be performing read data decoding between the start and end times of the interval t1+t2. With this assumption, the job scheduler 130 can then determine whether there exist any queued read operations executable by the actuator 104 that have a total execution time less than t1+t2. As used herein, "total execution time" refers to the sum of access time (seek and rotational latency) in addition to read time (e.g., the time that it takes to read data from the media). If there exists a second read operation queued for the actuator 104 with a total execution time less than the access time of the first read operation (e.g., t1+t2) selected for execution on the actuator 102, it is possible to schedule the two operations concurrently (e.g., to initiate respective seeks at the same time) without encountering a conflict for read channel resources.

As used herein, two operations are said to be scheduled concurrently whenever there is a temporal overlap in the intervals spanning the start and end times of each respective operation. For example, two operations are executed concurrently when they commence at the time (e.g., seeks on both actuators initiated at the same time) and also when they commence at different times (e.g., staggered starts) provided that the later-scheduled job commences before the earlier-scheduled job has terminated.

By leveraging the above-described capability to read data on one actuator while seeking to a new read position of the other actuator, read throughput is improved over single actuator devices that cannot read back any data while seeking. Moreover, total device throughput (read and write) is improved due to the deliberate scheduling of permissible types of concurrent operations—e.g., reads that occur while the other actuator is "seeking" and/or reads that occur while the other actuator is writing data.

Modeling data has shown that a storage device with the architecture of the multi-actuator storage device 100 implementing the above-described read scheduling can offer read throughput that is substantially similar to an identical device with two separate read channels. This capability is explored further with respect to example scheduling operations shown in FIG. 2A-2D.

Figure 2A:
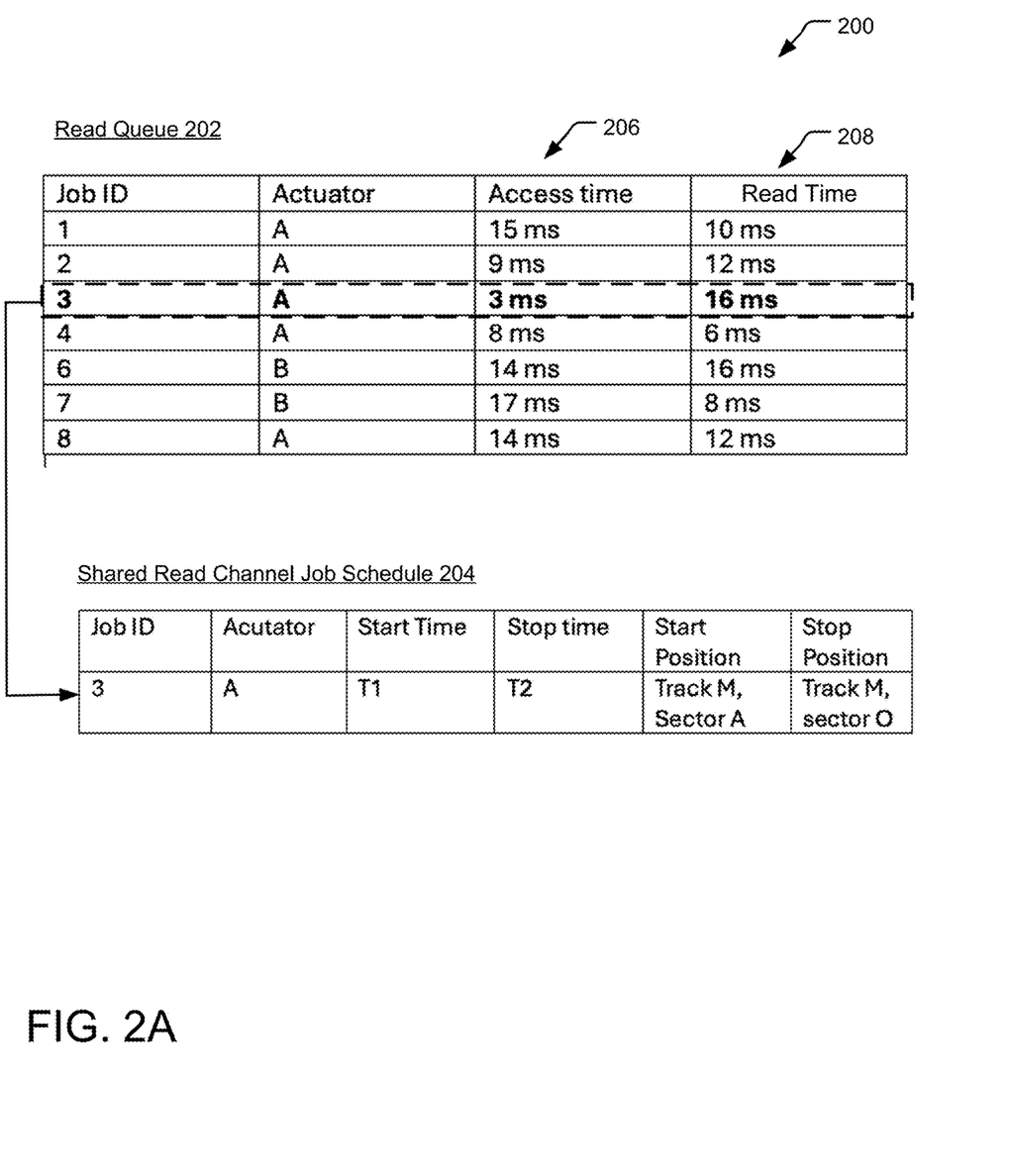
FIG. 2A illustrates an example scheduling operations performed by a job scheduler of a multi-actuator device with a read channel that is shared between two separate actuators.

FIG. 2A illustrates an example of scheduling operations 200 performed by a job scheduler (e.g., the job scheduler 130 of FIG. 1) of a multi-actuator device with a read channel shared between two separate actuators, as in the architecture shown in FIG. 1. In the example of FIG. 2A-2D, the two actuators of the multi-actuator storage device are referenced as Actuator A and Actuator B, respectively.

FIG. 2A illustrates a read queue 202 identifying select information about read jobs requested by a host device. The ordering of jobs shown in the read queue 202 is not intended to represent a selected execution order and is, instead, representative of an ordering of the jobs as provided to the multi-actuator storage device by the host device. In one implementation, the ordering of read jobs in the read queue 202 corresponds to an order in which the read jobs are requested by various applications operating on the host device, with the oldest (first-requested) job appearing at the top of the queue and newest (last-requested) job appearing at the bottom of the queue. The jobs in the read queue 202 are not executed according to the illustrated queue order (e.g., in numerical order of job ID, 1-8) and are, instead, subject to scheduling operations discussed with respect to FIG. 2A-2D to determine the execution order. This selected execution order is reflected in a "shared read channel job schedule 204" built (e.g., expanded) throughout the operations discussed below.

Although not shown in FIG. 2A, it is assumed that each read job request received from the host device identifies a target range of LBAs. The job scheduler of the multi-actuator storage device translates these target LBAs to corresponding physical positions on the storage media and delegates each job, based on these physical positions and/or other information, to a select one of two different device actuators—e.g., Actuator A or Actuator B.

The job scheduler also determines an access time (e.g., access times 206) for each queued read job that is based, at least in part, on the relative positions of the storage media and a corresponding actuator (A or B) when each job is initiated. Additionally, the job scheduler determines read times 208 that correspond to "read time" of a corresponding read job, e.g., the total time during which the read element is detecting bit values across the range of addresses targeted by the read job.

In determining which job to schedule next (with the highest priority in the shared read channel job schedule 204), the job scheduler employs a shortest-access-time methodology. Per this methodology, the pending job with the shortest access time is selected by default, with some exceptions discussed below pertaining to instances where two or more jobs have identical access times. In one implementation, a shortest access time methodology is used to select both read and write jobs—that is, jobs with shortest access times are identified as desirable candidates while other factors are considered to determine whether or not to permit concurrent scheduling of various pairs of jobs on the different actuators.

To simplify some of the herein-disclosed scheduling operations, the examples discussed with respect to FIG. 2A-2D are specific to read scheduling. The described scheduling operations may differ at times when the job scheduler has pending write operations to choose from in addition to pending reads. In one implementation, the scheduling "picks" discussed with respect to the below examples are picks resulting at times when there are either (1) no queued write operations or (2) no queued write operations with shorter access times than the read operation candidate(s) selected in each scheduling operation discussed below.

In the example of FIG. 2A, the job scheduler identifies job #3 as having the shortest access time (3 milliseconds) of all jobs in the read queue 202. Job #3 is therefore selected as the next job to be scheduled in the shared read channel job schedule 204.

After selecting job #3 as the next job to execute, the job scheduler determines whether any queued read jobs could be executed concurrently with job #3 without creating a conflict for the read channel resources shared between the two actuators. Specifically, the job scheduler determines whether there exist any queued read jobs with corresponding access times greater than the total execution time of the identified "shortest-access-time" job (job #3). In the illustrated example, job #3 has a total execution time of 19 ms (e.g., 3 ms of access time+16 ms of read time), and none of the queued read jobs have an access time greater than 19 ms. Therefore, the job scheduler determines it is not possible to schedule any read job concurrently with job #3.

Although not shown, the job scheduler may also consider pending write operations for concurrent operations with job #3. If, for example, a write queue of the storage device includes a write operation that can be executed by Actuator B, the job scheduler may elect to schedule that write operation current to the selected read job (job #3) on actuator A. If, alternatively, the write queue includes multiple write operations that can be executed by Actuator B, the job scheduler may select the write operation with the shorter access time for concurrent execution with job #3.

Job #3 is added to the shared read channel job schedule 204, as shown, with a start time (T1) and a stop time (T2). Throughout the examples of FIG. 2A-2D, the "start time" refers to the time that the actuator starts seeking for the corresponding job. It is further assumed that T1 occurs before T2, which occurs before T3, and so forth in numeral order. To help illustrate how the access times are updated when selecting the next job to schedule (after job #3), the shared read channel job schedule 204 is shown to identify a track position aligned with the read element on actuator A at the start and end job #3 (shown as "Start Position" and "Stop Position), respectively.

Figure 2B:
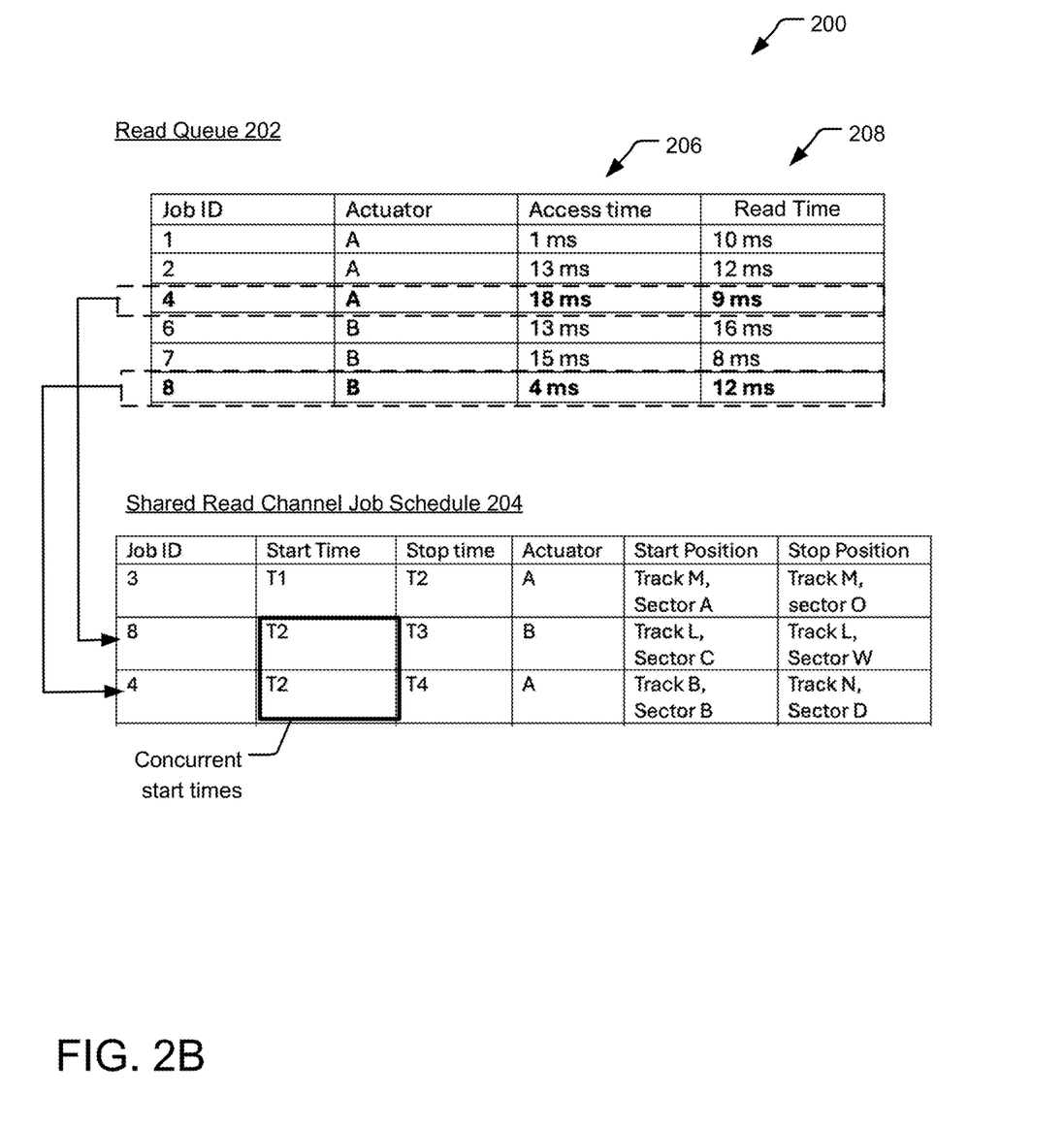
FIG. 2B illustrates example scheduling operations performed by the job scheduler of FIG. 2A immediately following the example scheduling operations of FIG. 2A.

FIG. 2B illustrates an example of scheduling operations 201 performed by the job scheduler of FIG. 2A immediately following the example scheduling operations 200 of FIG. 2A. After adding job #3 to the shared read channel job schedule 204, the job scheduler recomputes the access times 206 of the read jobs in the read queue 202 (and also the access times for the write jobs pending in the write queue, if there are pending writes) based on the respective positions of Actuator A and Actuator B at the time that the first scheduled read job (job #3) is scheduled to end (T2) (e.g. since the "end" of this previous read job corresponds with the time that the read channel is going to become next available). For the jobs queued on Actuator A, recomputing the access times 206 entails, for each read job, determining the quantity of time that it takes Actuator A to re-position its read element from a first position at time T2 (e.g., Track M, where it has finished job #3) to a starting track position of the read job and wait for the first target sector of the new job to rotate under the read element.

Similarly, the job scheduler determines a position of Actuator B and the storage media at time T2 and uses this information to recompute the access times for the queued read jobs on Actuator B. Notably, the position of the read element on Actuator B may change while job #3 is executing (e.g., between T1 and T2) due to execution of a write operation—not shown. It is assumed that the job scheduler also schedules write operations and, therefore, has access to actuator position changes that occur during the execution of write operations.

In determining which read job to schedule next (e.g., following job #3 in the read channel job schedule 204), the job scheduler again employs the shortest-access-time methodology. In this case, job #8 on Actuator B has the shortest overall access time–4 ms. Job #8 is therefore selected as the next job to be prioritized in the shared read channel job schedule 204.

After selecting job #8 as the next job to execute, the job scheduler next determines whether any queued read jobs could be executed concurrently with job #3 without double-booking the shared read channel for use at any point in time. Specifically, the job scheduler determines whether there exist any jobs with access times greater than the total execution time of job #8. Here, job #8 has a total execution time of 16 ms (4 ms of access time+12 ms of read time), and job #4 has an access time of 18 ms, which is greater than the 16 ms of total execution time for job #8. This means that it is possible to initiate the seek operations for jobs #4 and #8 concurrently while ensuring that job #8 on Actuator B will execute to completion before the expiration of the access time for job #4.

Due to the above, the job scheduler selects jobs 4 and 8 for concurrent execution, as shown in the shared read channel job schedule 204 in FIG. 2B. In this case, current execution means that the seek operations of these two respective jobs are scheduled to begin simultaneously (T2).

If, in the above-described scenario, the storage device also included one or more pending write jobs executable by Actuator A, the job scheduler may have alternatively scheduled a write job on actuator A for concurrent execution with job #8 on actuator B. In different implementations, different considerations may impact job selection when there exist multiple viable candidate jobs for concurrent execution with a read job. As discussed above, access time is a primary factor that may drive job selection due to both latency and power consumption considerations (e.g., lower access times correlate with reduced energy consumption during each seek); however, other potential considerations that may impact job selection for read operation concurrency include the length of time that the candidate jobs have been pending in the queue (e.g., jobs pending for longer may be favored for selection) and the number of pending read jobs v. pending write jobs (e.g., selections that balance the ratio may be desirable).

Figure 2C:
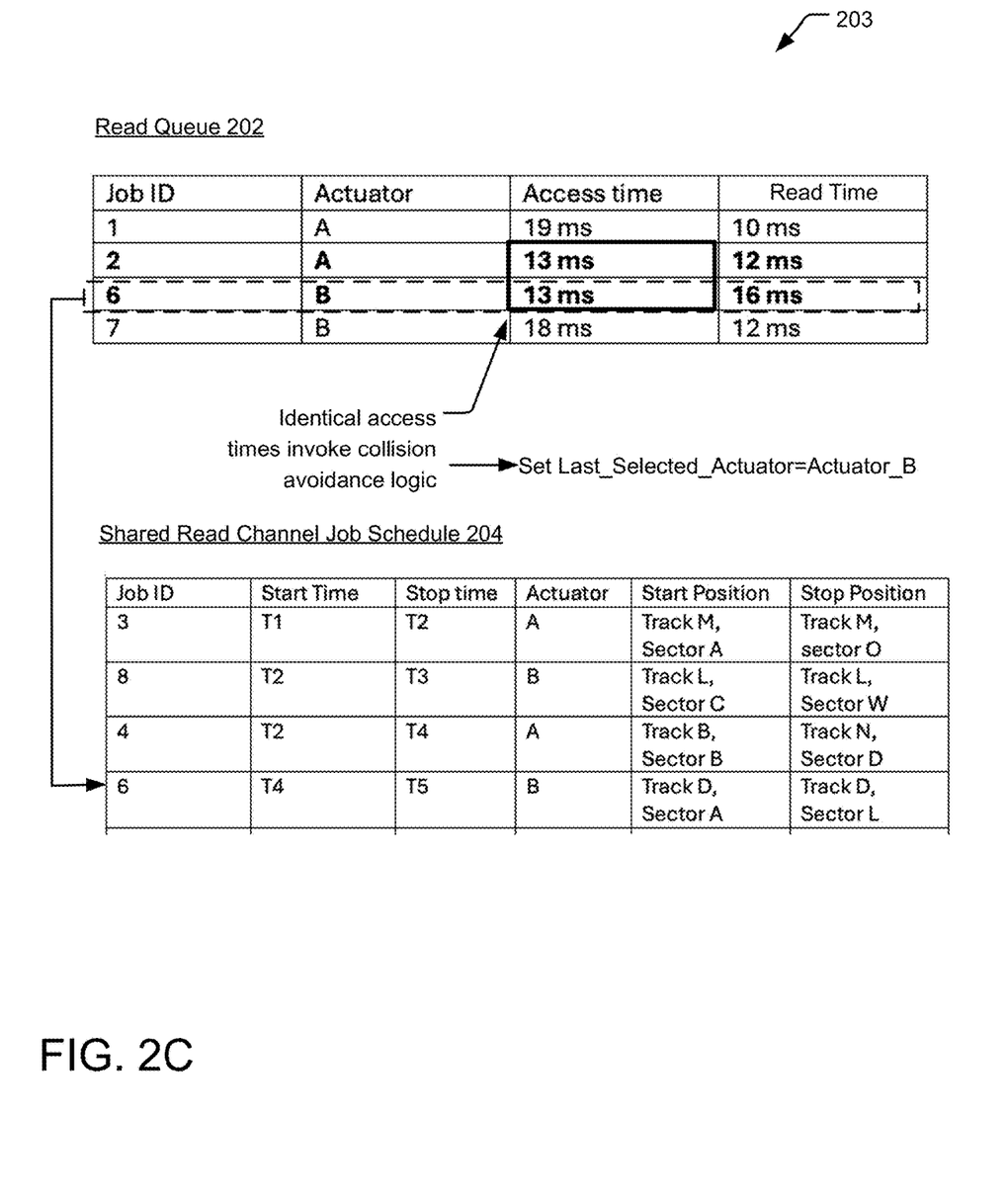
FIG. 2C illustrates example job scheduling operations performed immediately following the example scheduling operations of FIG. 2B.

FIG. 2C illustrates an example of job scheduling operations 203 performed immediately following the example scheduling operations 201 of FIG. 2B. After scheduling jobs #4 and #8 for concurrent execution in the shared read channel job schedule 204, the job scheduler again recomputes the access times 206 of the read jobs remaining in the read queue 202 based on the predicted positions of the read elements on Actuator A and Actuator B at the time that the read channel is next available. In this case, the read channel is next available at time T4—the end of job #4, with job #8 scheduled to terminate at time T3, which is during the "access time" interval of job #4.

In FIG. 2C, the access times for Actuator A jobs shown in read queue 202 are computed from the "stop position" of Actuator A relative to the storage media at the end of job #4 (e.g., track N, sector D). In contrast, the access times for the Actuator B jobs shown in the read queue 202 are computed from the position of Actuator B relative to the storage media at time T4 (which may or may not be the stop time of job #8, depending on whether or not Actuator B performs a write operation between T3 and T4).

In determining which read job to schedule next (e.g., following concurrent jobs #4 and #8, the job scheduler again employs the shortest-access-time selection methodology. In this case, jobs #2 and #6 have identical access times (13 ms). In this case, the shortest-access-time methodology selection leads to a "read collision" scenario, where an Actuator A job and an Actuator B job would need to use the shared read channel at the same time.

The job scheduler invokes collision avoidance logic to resolve this read collision that results in a tie when applying the shortest-access-time selection methodology. In one implementation, the collision avoidance logic is invoked exclusively in scenarios where the shortest-access-time selection results in a tie between two read jobs. If, in the above example, the shortest-access-time assessment results in a tie between a read job and a write job, the job scheduler may avoid invoking the collision avoidance logic by concurrently scheduling the read job and the write job.

In various implementations, the collision avoidance makes the selection between the colliding read jobs based on different, and in some cases, complex considerations. In a simple implementation that is illustrated in FIG. 2C, the selection between colliding read jobs is based on fairness. That is, the job scheduler attempts to balance the number of Actuator A jobs and Actuator B jobs selected over multiple iterations of the collision avoidance logic. This is achieved by alternating the selected actuator when resolving scheduling conflicts that invoke the collision avoidance logic. If, for example, the job scheduler selected an Actuator A job last time the collision avoidance logic was invoked (e.g., last time that lowest-access-time selection methodology resulted in a tie), the collision avoidance logic may provide for selecting the Actuator B job option on this iteration of the collision avoidance logic, while again reverting to the Actuator A job option on the next iteration of the collision avoidance logic.

In FIG. 2C, this "alternating" actuator selection is represented by a stored variable "Last_Selected_Actuator" that is dynamically updated each time the collision avoidance logic is invoked. In some cases, the "Last_Selected_Actuator" may be reset to a default value each time the read queue 202 empties and there are no pending host-initiated read operations. In the example shown, the job scheduler selects Actuator B (job #6) over Actuator A (job #2), and the "Last_Selected_Actuator" variable is updated to "Actuator B", which ensures that an "Actuator A" job will be selected next time the shortest access time pick results in a tie, invoking the collision avoidance logic (e.g., as in the scenario illustrated in FIG. 2C). Following the selection of job #6 as described above, job #6 is added to the shared read channel job schedule 204 with a scheduled start time of T4 and an end time of T5.

Notably, the above-described "actuator balancing" may not be the dominant selection factor in all instances that invoke the collision avoidance logic. For example, the length of time that the "colliding" read jobs have been pending in the read queue 202 can, in some scenarios, factor into the resolution of the conflict. For example, the collision avoidance algorithm may provide for selecting the older (longer-pending job) in situations when one of the colliding read jobs has been pending a long period of time and is, for example, approaching an execution deadline set by the host or storage device controller.

In still other scenarios, the "pick" between the colliding read jobs hinges not on the characteristics of these two jobs individually, but instead upon the characteristics of other queued jobs that could potentially be executed concurrent to whichever one of the colliding read jobs is ultimately selected. Stated differently, the selection between job #2 and job #6 in FIG. 2C depends upon the "desirability" of other queued operations that could potentially be scheduled concurrent with either job #2 or job #6. In implementations, this desirability of a given job candidate is assessed in terms of the impact that the job candidate has on read/write throughput and energy consumption of the storage device (e.g., energy consumption measured per unit throughput).

In one example of the above-described assessment, the collision avoidance logic selects between colliding read jobs based on the ratio of jobs pending in the write queue for actuator A and the write queue actuator B. That is, the job scheduler makes some scheduling decisions to drive this ratio closer to 1 in the interest of maximizing disk access concurrency. For example, in the storage device of FIG. 1 it is possible to execute concurrent writes without restriction because there are two write channels. If, in this storage device, there are 50 writes pending on actuator A and 20 writes pending on actuator B, this scenario may favor the option to "pair" actuator A write operations with actuator B read operations whenever possible because this would have the effect of increasing overall disk access concurrency and minimize the amount of time that either actuator remains idle while the other is reading or writing data.

In another implementation, the collision avoidance logic selects between colliding read jobs based on power consumption considerations. If, for example, picking a colliding read job on actuator A would result in a decreased energy expenditure per unit of data throughput due to characteristics of the best-available "second choice" option on actuator B, the actuator A read job may be favored for selection. For example, the job scheduler may compute an energy expenditure difference that results when selecting between option (1), which provides for executing job #2 on Actuator A concurrently with the lowest-latency write job pending for Actuator B, and option (2), which provides for executing job #6 on Actuator B for concurrently with the lowest-latency write job pending on Actuator A. If this differential exceeds a threshold (e.g., meaning one of the two options presents notable energy savings), the lower-energy option may be favored for selection.

Simulations of the above-described scheduling logic have shown that overall device throughput is not noticeably degraded as compared to device throughput that can be realized in a dual-actuator device that does not limit the types of operations that can be performed concurrently. Specifically, this surprisingly good throughput is observed when the herein-described "lowest-access-time selection methodology" is employed to make primary picks while also (1) selecting jobs to execute concurrently with each primary pick whenever a viable option can be identified and while also (2) prohibiting concurrent read jobs that occasionally "collide" as the best pick option, as generally described above. The high performance that is observed in devices implementing the above-described scheduling logic is due, in part, to the fact that average customer workflows have greater numbers of writes than reads. Therefore, when a read operation is selected using the above-described lowest-access-time methodology, there is a high likelihood of there existing a co-pending write operation that can be selected for concurrent execution with selected read without a significant performance loss as compared to algorithms that place no restrictions on read concurrency. Additional advancements in read throughput are realized due to the herein-disclosed concurrency logic that permits reads to be executed during read seeks, as in the example provided with respect to FIG. 2B.

Figure 2D:
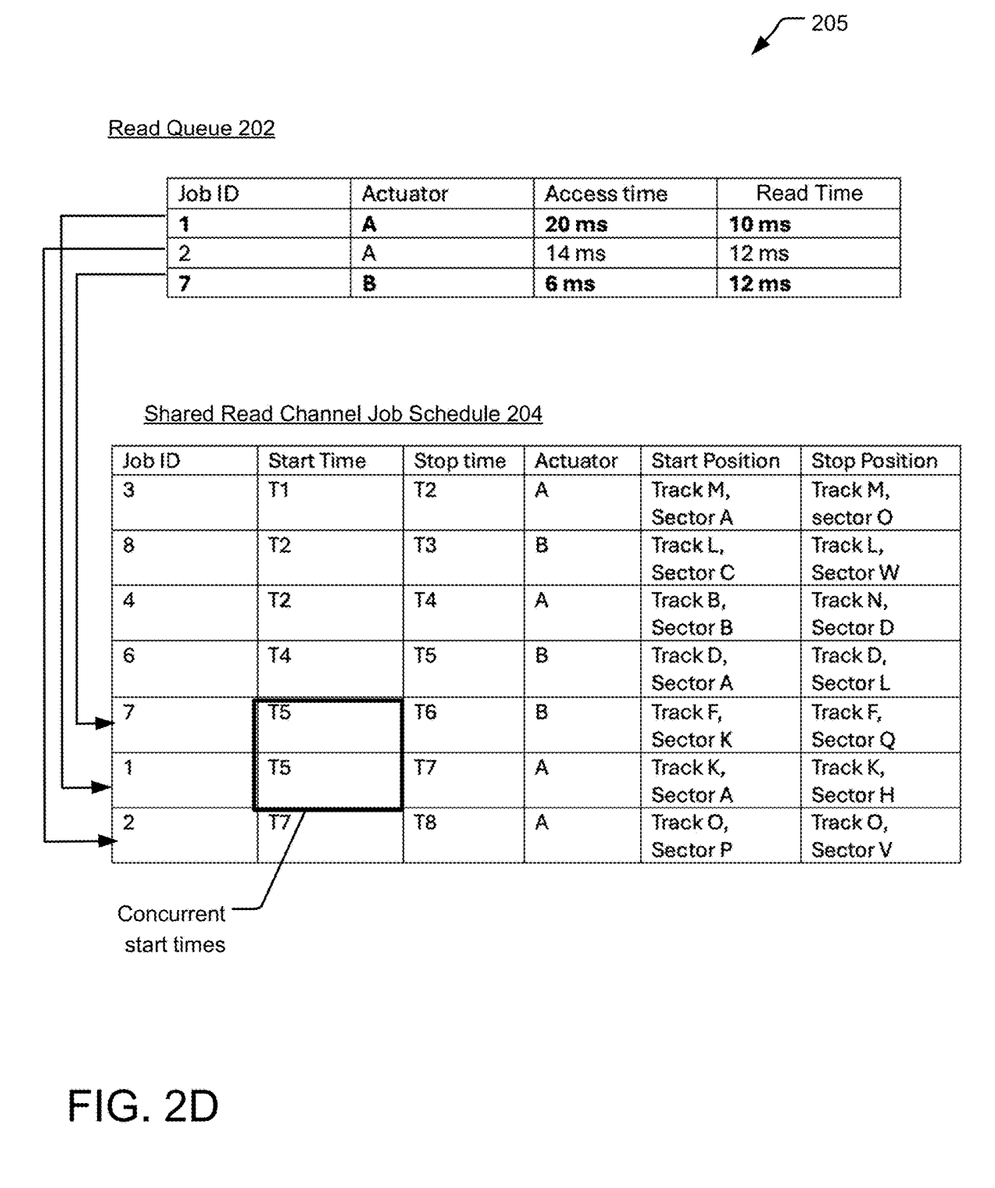
FIG. 2D illustrates example job scheduling operations performed immediately following the example scheduling operations 203 of FIG. 2C.

FIG. 2D illustrates an example of job scheduling operations 205 performed immediately following the example scheduling operations 203 of FIG. 2C. After scheduling job #6, three jobs are remaining the read queue 202 (Job #1, #2, and #7). The job scheduler again recomputes access times for the queued read jobs based on the position of Actuator A and Actuator B, respectively, at the end time of the last-scheduled read job (T5)—e.g., the time that the shared read channel is freed up. These updated access times are reflected in the read queue 202 of FIG. 2D. In this example, the access time for job #7 (the sole remaining Actuator B job) is computed based on the stop position (e.g., Track D, Sector L) of Actuator B at the end of job #6 (T5), while the access times for jobs #1 and #2 (the Actuator A jobs) are computed based on the position of Actuator A at T5, which may be either the stop position of job #4 or another position if Actuator A has been used to carry out a write operation at any time between T4 and T5.

The job scheduler again employs the lowest-access-time selection methodology and determines that job #7 now has the lowest access time (6 ms) of the three remaining options. Therefore, job #7 is selected as the next job to be prioritized in the shared read channel job schedule 204.

After selecting job #7 as the next job to execute, the job scheduler determines whether any queued read jobs could be executed concurrently with job #7 without creating a conflict for read channel resources. Specifically, the job scheduler looks to determine if there exists a queue read job with an access time that is greater than the total execution time of job #7, which is 18 ms (e.g., 6 ms of access time+12 ms of read time). In this case, job #1 has an access time of 20 ms, which is determined to be greater than the 18 ms of total execution time for job #7. Based on this, the job scheduler determines that job #1 and job #7 can be executed concurrently.

Consequently, jobs #1 and #7 are added for concurrent execution in the shared read channel job schedule 204, with both being scheduled to start at T5 (e.g., the time that the read channel is freed after completing job #6). Since job #7 has a total execution time less than the access time for job #1, job #7 completes at T6, which is during the 20 ms access time interval for job #1. Following completion of job #7, job #1 begins its data read and completes at T7.

Again, if the storage device had pending write jobs in addition to the illustrated pending read jobs, the job scheduler may, in some scenarios, elect to schedule a write operation concurrent to job #7 instead of the read operation (e.g., job #1). This decision could be based on factors mentioned elsewhere herein including deadlines on the execution of each pending job, energy savings per unit of data throughput realized as a result of selecting one pair of jobs for concurrent execution instead of another, the ratio of write jobs pending on each actuator, the quantities of time that the actuators are used concurrently v. nonconcurrently as a result of selecting each option, and more.

In the example of FIG. 2D where there are no pending write jobs, job #2 is now the sole remaining unscheduled read job in the read queue 202. The job scheduler adds this job to the end of the shared read channel job schedule 204, such that it is scheduled to commence at time T7 when the previous read job ends.

Notably, the host device may update the read queue 202 dynamically at any time during the scheduling operations and/or during the execution of the queued read jobs. These new incoming jobs are the above-described job scheduling methodology that employs a default lowest-access-time selection rule and that employs logic to schedule jobs concurrently, to support reading during seeking, when possible, while also using the above-described collision avoidance logic.

Figure 3:
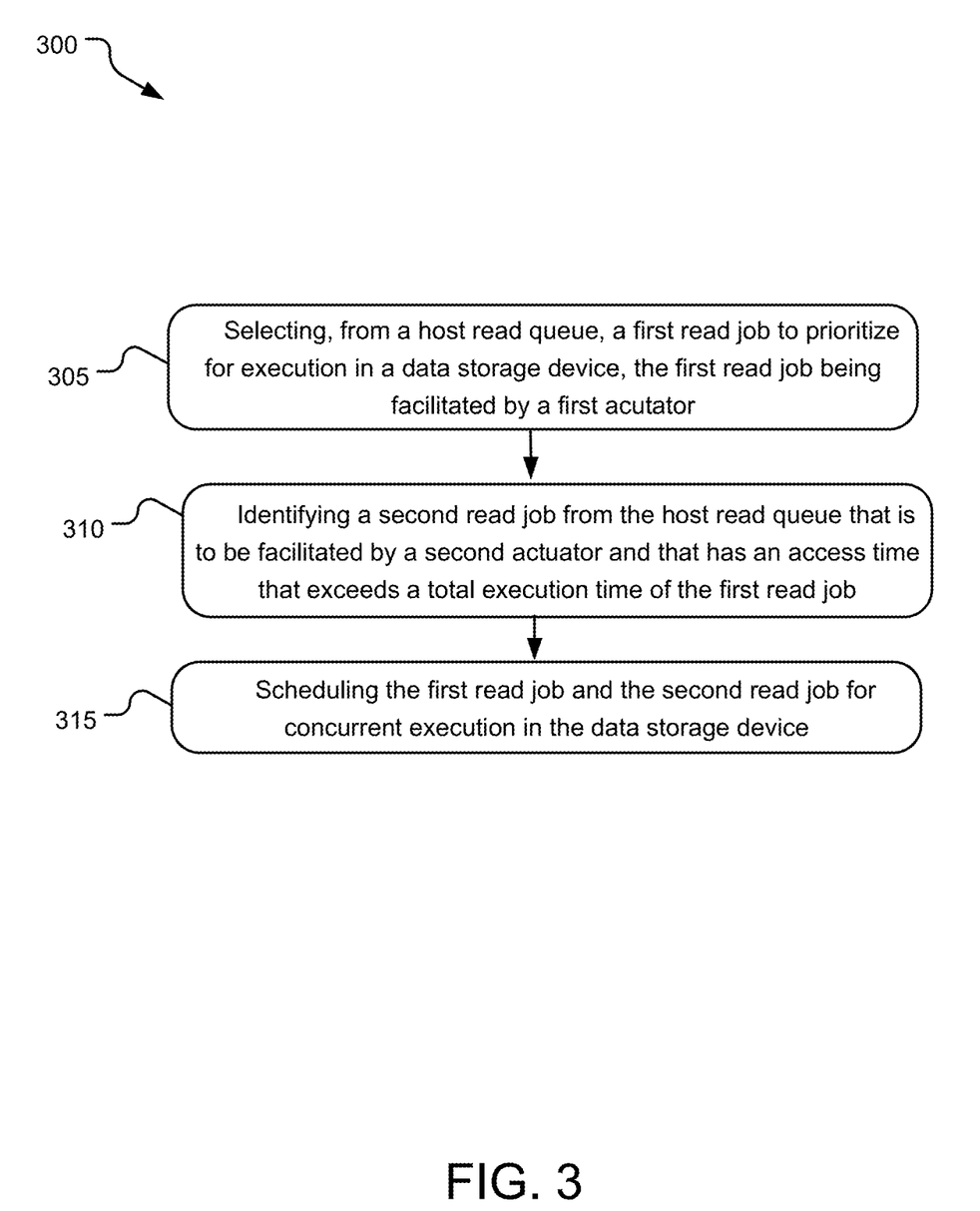
FIG. 3 illustrates example scheduling operations in a data storage device with multiple actuators and a read channel that is shared between the read elements on at least two of the actuators.

FIG. 3 illustrates example scheduling operations in a data storage device with multiple actuators and a read channel that is shared between the read elements on at least two of the actuators. A selection operation 305 provides for selecting a first read job from a host read queue to prioritize for execution. Data of the first read job is read by a read element a first actuator of the data storage device. In one implementation, the selection operation 305 is based on a lowest-access-time selection methodology, as described elsewhere herein.

An identifying operation 310 identifies a second read job from the host read queue that is to be facilitated by a second actuator of the data storage device and that has an access time exceeding the total execution time of the first read job. Responsive to the identifying operation 310, a scheduling operation 315 schedules the first read job and the second read job for concurrent execution. This concurrent scheduling enhances the read throughput of the data storage device as compared to a single actuator device while still allowing the two actuators to share a single read channel.

Figure 4:
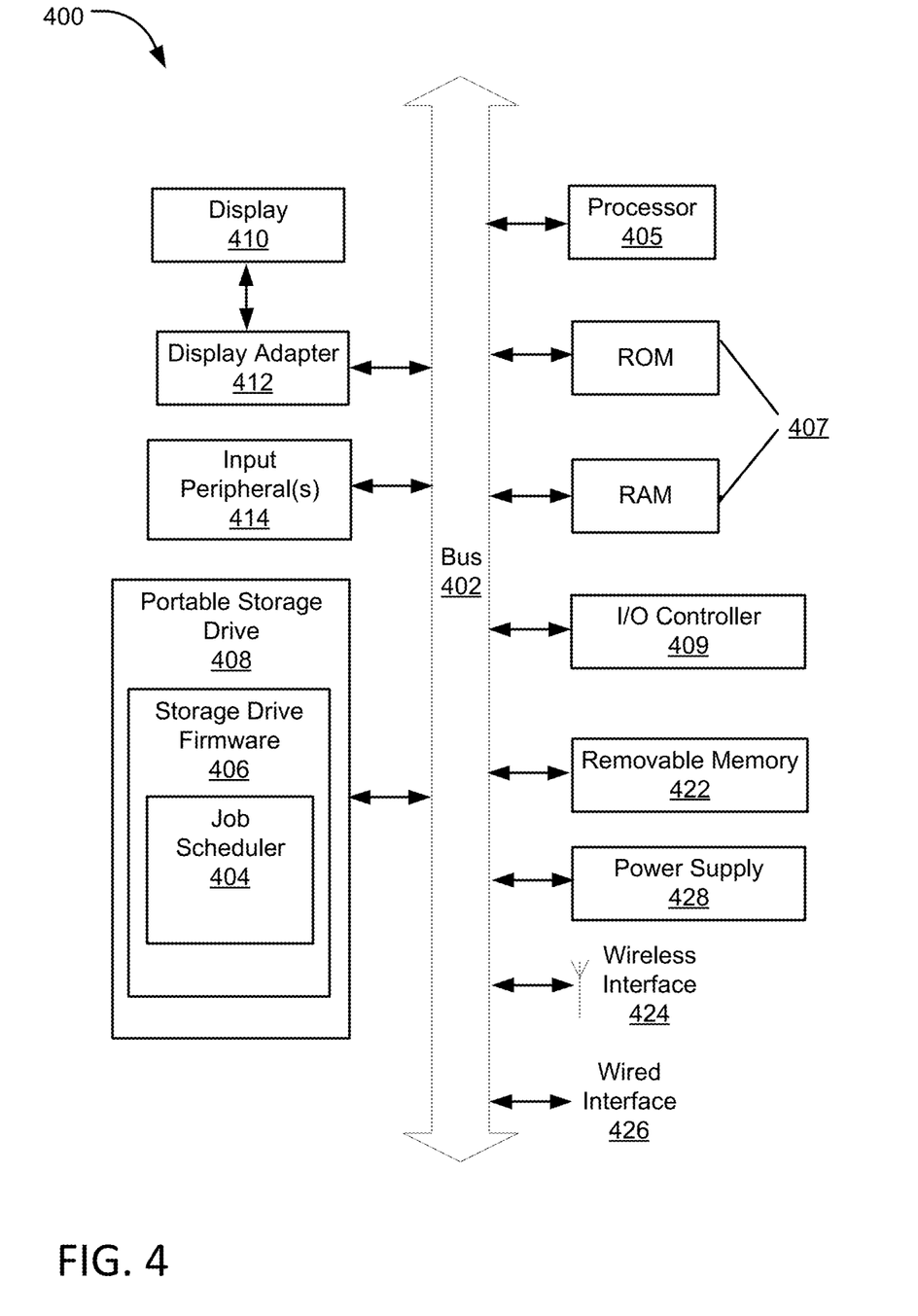
FIG. 4 illustrates an example system diagram of a computer system suitable for implementing aspects of a job scheduler embedded in firmware on a connected storage drive.

FIG. 4 illustrates an example system diagram of a computer system 400 suitable for implementing aspects of a job scheduler 404 embedded in firmware 406 on a connected storage drive 408. For example, the storage drive 408 is connected to a data storage network via the computer system 400, which is being used as a user terminal within the data storage network. The system 400 includes a bus 402 which interconnects major subsystems such as a processor 405, internal memory 407 (such as random-access memory (RAM) and read-only memory (ROM)), an input/output (I/O) controller 409, removable memory (such as a memory card) 422, a power supply 428, and external devices such as a display screen 410 via a display adapter 412, and various input peripherals 414 (e.g., a mouse, trackpad, keyboard, touchscreen, joystick, and/or smart card acceptance device). Wireless interface 424 together with a wired network interface 426, may be used to interface to the data storage network and/or a local or wide area network (such as the Internet) using any network interface system known to those skilled in the art.

Many other devices or subsystems (not shown) may be connected in a similar manner (e.g., servers, personal computers, tablet computers, smart phones, mobile devices, etc.). Also, it is not necessary for all the components depicted in FIG. 4 to be present to practice the presently disclosed technology. Furthermore, devices and components thereof may be interconnected in different ways from that shown in FIG. 4. Code (e.g., computer software, to implement the presently disclosed technology) may be operably disposed in the internal memory 407, stored on removable storage media such as the removable memory 422 or the storage drive 408, a floppy disk, a thumb drive, and/or an optical medium. For example, in an implementation of the computer system 400, the job scheduler 404 described in detail above may be stored in the firmware 406, as shown.

The computing system 400 may include a variety of tangible computer-readable storage media (e.g., the internal memory 407, the removable memory 422, and the storage drive 408) and intangible computer-readable communication signals. Tangible computer-readable storage can be embodied by any available media that can be accessed by the computing system 400 and includes both volatile and non-volatile storage media, as well as removable and non-removable storage media implemented in any method or technology for storage of information such as computer readable instructions, data structures, program modules, and/or other data. Tangible computer-readable storage media includes, but is not limited to, firmware, RAM, ROM, electrically erasable programmable read-only memory (EEPROM), flash memory or other memory technology, optical disc storage, magnetic cassettes, magnetic tape, magnetic disc storage or other magnetic storage devices, or any other tangible medium which can be used to store the desired information and which can be accessed by the computing system 400.

Intangible computer-readable communication signals may embody computer readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, radio-frequency (RF), infrared (IR), and other wireless media. Computer-readable storage media as defined herein specifically excludes intangible computer-readable communications signals.

Some implementations may comprise an article of manufacture which may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (APIs), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

The presently disclosed technology may be implemented as logical steps in one or more computer systems (e.g., as a sequence of processor-implemented steps executing in one or more computer systems and as interconnected machine or circuit modules within one or more computer systems). The implementation is a matter of choice, dependent on the performance requirements of the computer system implementing the presently disclosed technology. Accordingly, the logical operations making up implementations of the presently disclosed technology are referred to variously as operations, steps, objects, or modules. Furthermore, logical operations may be performed in any order, adding or replacing operations as desired, unless explicitly claimed otherwise or a specific order is inherently necessitated by the claim language.

The above specification, examples, and data provide a complete description of the structure and use of exemplary implementations of the presently disclosed technology. Since many implementations of the presently disclosed technology can be made without departing from the spirit and scope of the invention, the presently disclosed technology resides in the claims hereinafter appended. Furthermore, structural features of the different implementations may be combined in yet another implementation without departing from the recited claims.

What is claimed is:

1. A multi-actuator storage device comprising:
a first actuator supporting a first read head coupled to a read channel;
a second actuator supporting a second read head coupled to the read channel;
a job scheduler stored in memory and executable to:
use a lowest-access time selection methodology to select a next job to schedule for execution; and
in response to selecting a first read job as the next job to execute on the first actuator, identifying a pending job for the second actuator that can be executed concurrent to the first read job without concurrently accessing the read channel;
scheduling the pending job on the second actuator concurrent to the first read job.

2. The multi-actuator storage device of claim 1, wherein the pending job on the second actuator is a second read job and selection of the second read job is based on a length of an access time for the second read job.

3. The multi-actuator storage device of claim 2, wherein a combined access and read time of the first read job is less than the access time of the second read job.

4. The multi-actuator storage device of claim 3, wherein scheduling the pending job on the second actuator concurrent to the first read job includes instructing a read/write controller to initiate a first seek operation for the first read job concurrent to a second seek operation of the pending job.

5. The multi-actuator storage device of claim 1, wherein the job scheduler implements collision avoidance logic to select between the first read job of the first actuator and a second read job of the second actuator, the first read job and the second read job having identical access times.

6. The multi-actuator storage device of claim 5, wherein the collision avoidance logic provides for selecting between the first read job and the second read job based on at least one of:
an identity of an actuator that performed a selected job on a previous iteration of the collision avoidance logic;
a length of time that the first read job and the second read job have been queued;

characteristics of jobs identified as candidates for concurrent execution with the first read job and the second read job; and a number of jobs queued for execution by the first actuator and the second actuator.

7. The multi-actuator storage device of claim 1, wherein the first actuator and the second actuator are configured to move independent of one another.

8. The multi-actuator storage device of claim 1, wherein the pending job for the second actuator is a write job.

9. A method of job scheduling a multi-actuator storage device, the method comprising:

selecting a first read job to prioritize for execution from queue, the first read job being executable by a first actuator in a multi-actuator device that includes a read channel shared between the first actuator and a second actuator;

identifying a second read job from the queue that is executable by the second actuator and that has an access time that exceeds a total execution time of the first read job; and based on the access time an access time exceeding the total execution time of the first read job, scheduling the first read job and the second read job for concurrent execution.

10. The method of claim 9, wherein selecting the first read job is based on a lowest-access-time selection methodology and the first read job has an access time that is lower than the access time of any other read job queued for execution on the first actuator.

11. The method of claim 10, further comprising:

recomputing access times for read jobs pending in the queue based on a position of the first actuator or the second actuator at an end of the second read job;

employing a lowest-access-time selection methodology to identify a third read job to prioritize for execution from queue, the third read job having an identical access time to a fourth read job in the queue; and executing collision avoidance logic to select between the third read job and the fourth read job as a next-scheduled job following the second read job.

12. The method of claim 11, wherein the collision avoidance logic provides for selecting between the third read job and the fourth read job based on at least one of:

an identity of an actuator that performed a selected job on a previous iteration of the collision avoidance logic;

a length of time that the first read job and the second read job have been queued;

characteristics of jobs identified as candidates for concurrent execution with the first read job and the third read job; and a number of jobs queued for execution by the first actuator and the second actuator.

13. The method of claim 9, wherein the first actuator and the second actuator are configured to move independent of one another.

14. One or more non-transitory computer-readable storage media encoding processor-executable instructions to execute a computer process, the computer process comprising:

selecting a next job to schedule for execution by a first actuator in a multi-actuator device that includes a read channel shared between the first actuator and a second actuator;

in response to selecting a first read job as the next job on the first actuator, identifying a pending job for the second actuator that can be executed concurrent to the first read job without concurrently accessing the read channel; and scheduling the pending job for the second actuator concurrent to the first read job.

15. The one or more non-transitory computer-readable storage media of claim 14, wherein the pending job on the second actuator is a second read job and selection of the second read job is based on a length of an access time for the second read job.

16. The one or more non-transitory computer-readable storage media of claim 15, wherein a combined access and read time of the first read job is less than the access time of the second read job.

17. The one or more non-transitory computer-readable storage media of claim 14, wherein scheduling the pending job on the second actuator concurrent to the first read job includes instructing a read/write controller to initiate a first seek operation for the first read job concurrent to a second seek operation of the pending job.

18. The one or more non-transitory computer-readable storage media of claim 14, wherein the first actuator and the second actuator are configured to move independent of one another.

19. The one or more non-transitory computer-readable storage media of claim 14, wherein the computer process further comprises:

executing collision avoidance logic to select between the first read job of the first actuator and a second read job of the second actuator, the first read job and the second read job having identical access times.

20. The one or more non-transitory computer-readable storage media of claim 19 wherein the collision avoidance logic provides for selecting between the first read job and the second read job based on at least one of:

an identity of an actuator that performed a selected job on a previous iteration of the collision avoidance logic;

a length of time that the first read job and the second read job have been queued;

characteristics of jobs identified as candidates for concurrent execution with the first read job and the second read job; and a number of jobs queued for execution by the first actuator and the second actuator.

* * * * *